(12) United States Patent
Dehmas et al.

(10) Patent No.: US 11,362,752 B2
(45) Date of Patent: Jun. 14, 2022

(54) DEVICE AND METHOD FOR COMMUNICATIONS SIGNALLING THROUGH A FRAGMENTED SPECTRUM

(71) Applicant: COMMISSARIAT A L'ENERGIE ATOMIQUE ET AUX ENERGIES ALTERNATIVES, Paris (FR)

(72) Inventors: Francois Dehmas, Grenoble (FR); Vincent Berg, Grenoble (FR); Valerian Mannoni, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/991,235

(22) Filed: Aug. 12, 2020

(65) Prior Publication Data

US 2021/0050928 A1 Feb. 18, 2021

(30) Foreign Application Priority Data

Aug. 14, 2019 (FR) ...................................... 19 09205

(51) Int. Cl.
*H04J 13/00* (2011.01)
*H04B 1/715* (2011.01)
(Continued)

(52) U.S. Cl.
CPC .......... *H04J 13/0062* (2013.01); *H04B 1/715* (2013.01); *H04B 1/7156* (2013.01); *H04L 5/0048* (2013.01)

(58) Field of Classification Search
CPC .... H04J 13/0062; H04B 1/715; H04B 1/7156
See application file for complete search history.

(56) References Cited

U.S. PATENT DOCUMENTS 7,583,721 B2 * 9/2009 El Nahas El Homsi .................... H04B 1/712
375/130
8,565,063 B2 * 10/2013 Wang .................... H04L 1/0041
370/208

(Continued)

OTHER PUBLICATIONS

U.S. Appl. No. 16/156,050, filed Oct. 10, 2018, 20190113599 A1, Maceraudi, J, et al.

(Continued)

*Primary Examiner* — Chandrahas B Patel
(74) *Attorney, Agent, or Firm* — Oblon, McClelland, Maier & Neustadt, L.L.P.

(57) ABSTRACT

The invention relates to a device for transmission of data on a frequency spectrum divided into a plurality $N_f$ of spectrum fragments $(f_1, f_2)$ each of which covers a frequency band, the frequency bands being discontiguous. The device comprises a packet generator configured to generate a data packet comprising a payload and at least one occurrence of a constant envelope signalling sequence. Said sequence, for example a modified Zadoff-Chu sequence, comprises N complex symbols and consists of a plurality of complex symbol sets each associated with one of the spectrum fragments. Each set comprises N/Nf complex symbols and each complex symbol of a set comprises a scaling term to the frequency band covered by the spectrum fragment associated with this set and a spectral transposition term in the frequency band covered by the spectrum fragment associated with this set.

9 Claims, 5 Drawing Sheets

(51) Int. Cl.
*H04B 1/7156* (2011.01)
*H04L 5/00* (2006.01)

(56) References Cited

U.S. PATENT DOCUMENTS

| | | | |
|---|---|---|---|
| 8,731,027 B2* | 5/2014 | Moradi | H04K 3/827 375/143 |
| 9,210,000 B2 | 12/2015 | Dore et al. | |
| 9,231,653 B2 | 1/2016 | Dehmas et al. | |
| 9,236,894 B2 | 1/2016 | Ouvry et al. | |
| 9,246,537 B2 | 1/2016 | Dehmas et al. | |
| 9,438,307 B2 | 9/2016 | Dehmas et al. | |
| 9,596,118 B2 | 3/2017 | Dore et al. | |
| 9,998,159 B2 | 6/2018 | Dehmas | |
| 10,374,858 B2 | 8/2019 | Roth et al. | |

OTHER PUBLICATIONS

French Preliminary Search Report dated Apr. 17, 2020 in French Application 19 09205 filed on Aug. 14, 2019 (with English Translation of Categories of Cited Documents), 3 pages.

Rui et al., "Carrier Aggregation for LTE-Advanced: Uplink Multiple Access and Transmission Enhancement Features", Technical Report of Wireless Networking Group, Coordinated Science Laboratory, Dept. Electrical and Chemical Engineering; University of Illinois at Urbana-Champaign US, vol. 20, No. 4, Aug. 1, 2013, 9 pages.

Dehmas et al., "Turbo-FSK, a Physical Layer for LPWA: Synchronization and Channel Estimation", 2018 European Conference on Networks and Communications (EUCNC), IEEE, Jun. 18, 2018, pp. 1-5.

Mannoni et al., "A Flexible Physical Layer for LPWA Applications: Simulations and Field Trials", 2019 IEEE 5th World Forum on Internet of Things (WF-IOT), IEEE, Apr. 15, 2019, pp. 160-164.

Guizar et al., "Massive Deployment Evaluation of Adaptive LPWA Networks Using Turbo-FSK", 2018 $14^{th}$ International Conference on Wireless and Mobile Computing, Networking and Communications (WIMOB), IEEE, Oct. 15, 2018, pp. 1-8.

Bahl et al., "Optimal Decoding of Linear Codes for Minimizing Symbol Error Rate" (correspondence), IEEE Trans. on Information Theory, vol. 20, No. 2, Mar. 1974, pp. 284-287.

* cited by examiner

DEVICE AND METHOD FOR COMMUNICATIONS SIGNALLING THROUGH A FRAGMENTED SPECTRUM

TECHNICAL FIELD

The field of the invention is machine to machine or M2M communications in the context of the Internet of the Things (IoT) and more particularly radio communications in Low Power Wide Area (LPWA) networks characterised by wide coverage while having low energy consumption.

PRIOR ART

One of the challenges of long range communications systems is their energy consumption, particularly of transmitters. A constant envelope at the transmitter makes it possible to optimise the energy efficiency of the transmission amplifier and to keep the power consumed by the transmitter to very low levels.

One example of a modulation scheme with a constant envelope is the Turbo-FSK scheme that combines an FSK (frequency shift keying) modulation with a set of convolution codes concatenated in parallel. The paper by F. Dehmas, V. Mannoni and V. Berg, "Turbo-FSK, a Physical Layer for LPWA: Synchronization and Channel Estimation," 2018 European Conference on Networks and Communications (EuCNC), Ljubljana, Slovenia, 2018, pp. 1-5, describes a synchronisation and channel estimation adapted to the Turbo-FSK scheme. To achieve this, the signalling (preamble and pilots) is based on constant amplitude and zero auto-correlation sequences (Constant Amplitude Zero Auto-correlation (CAZAC) sequences), and specifically modified Zadoff-Chu sequences.

This paper does not consider a fragmented spectrum, in other words a frequency spectrum divided into a plurality of spectrum fragments each of which covers a frequency band, the frequency bands being discontiguous. However, the use of such a fragmented spectrum can be useful, particularly in the following cases:
   to make expedient use of holes in a congested spectrum;
   to increase the throughput by increasing the used bandwidth, which is less restrictive if the band can be fragmented;
   to obtain a system with a better range and/or a better throughput by adding frequency diversity, the use of several non-contiguous bands reducing the probability of being in a fading hole, particularly for radio systems that, like LPWA, access the spectrum sporadically;
   to make use of licensed and unlicensed bands.

Transposition of the technique disclosed in the paper mentioned above into a communication system making use of a fragmented spectrum would consist of adding several signalling sequences, these sequences being associated with different frequencies to cover the different spectrum fragments. However such a solution would not be satisfactory because it would be accompanied by a loss of energy efficiency because the Peak to Average Power Ratio (PAPR) would be much higher than 0 dB.

Another solution could consist of using a wave shape with a PAPR of 0 dB on a fragmented spectrum (for example Turbo-FSK symbols in the example considered). But the auto-correlation properties of such symbols are mediocre, which would impact the quality of the temporal synchronisation.

The paper by Y. Rui, P. Cheng, M. Li, Q. T. Zhang, and M. Guizani, "Carrier aggregation for lte-advanced: uplink multiple access and transmission enhancement features," IEEE Wireless Communications, vol. Vol. 20, No. 4, pp. 101-108, 2013, discloses how access diagrams can be used to exploit a fragmented spectrum and techniques for reducing the PAPR. But in this article, the signal envelope is not constant and therefore the PAPR remains very much higher than 0 dB even with the use of PAPR reduction techniques. Consequently, the energy efficiency of the transmission amplifier is not optimised, resulting in high energy consumption of the transmitter.

PRESENTATION OF THE INVENTION

The purpose of the invention is to disclose a method of signalling for a radio link for which the spectral support is fragmented, this method guaranteeing both a constant envelope at the transmitter to optimise energy efficiency and protected spectral properties of the waveshape to which this signalling is applied to guarantee the precision of the synchronisation or of the channel estimation.

It relates to a device for transmission of data on a frequency spectrum divided into a plurality $N_f$ of spectrum fragments each of which covers a frequency band, the frequency bands being discontiguous. This device comprises a packet generator configured to generate a data packet comprising a payload and at least one occurrence of a constant envelope signalling sequence. Said sequence comprises N complex symbols and consists of a plurality of complex symbol sets, each associated with one of the spectrum fragments. Each set comprises N/Nf complex symbols and each complex symbol of a set comprises a scaling term to the frequency band covered by the spectrum fragment associated with this set and a spectral transposition term in the frequency band covered by the spectrum fragment associated with this set.

The spectral transposition term distributes the complex symbol in the frequency band covered by the spectrum fragment associated with the set and the scaling term makes it possible to distribute uniformly the complex symbols of the set in the frequency band covered by the spectrum fragment associated with this set.

Some preferred but non-limitative aspects of this device are as follows:
   each symbol S[n] of the set associated with the i-th spectrum fragment corresponds to the $Sca(\Delta f_i)*TF(f_{li})$ product in which $Sca(\Delta f_i)$ is the scaling term and $TF(f_{li})$ is the spectral transposition term, $$\frac{iN}{N_f} \leq n < \frac{(i+1)N}{N_f}$$

and the i-th spectrum fragment covering a frequency band that is delimited by a low frequency $f_{li}$, a high frequency $f_{hi}$ and with a width of $\Delta f_i = f_{li} - f_{hi}$;

$$Sca(\Delta fi) = \exp\left(\frac{j2\pi\left(n - \frac{iN}{Nf}\right)^2 \Delta f_i}{Nf_{ech}}\right)$$

and $TF(f_{li}) = \exp(j2\pi v_{li} n)$, where $f_{ech}$ is the sampling frequency and $v_{li}$ is the reduced frequency $f_{li}/f_{ech}$;
   the data packet generated by the packet generator comprises a preamble and the packet generator is configured to insert the at least one occurrence of said sequence as a synchronisation sequence in the preamble;

the preamble carries a plurality of occurrences of said sequence, in succession;

the packet generator is configured to insert the at least one occurrence of said sequence into the payload, as a pilot sequence;

it also comprises a modulator configured to implement a Turbo-FSK modulation.

The invention also relates to a device for reception of data from a frequency spectrum divided into a plurality Nf of spectrum fragments each of which covers a frequency band, the frequency bands being discontiguous. This device comprises a synchronisation unit and a channel estimation unit and at least one of said units is configured to exploit a constant envelope signalling sequence which is known by said device. Said sequence comprises N complex symbols and consists of a plurality of complex symbol sets, each associated with one of the spectrum fragments. Each set comprises N/Nf complex symbols and each complex symbol of a set comprises a scaling term to the frequency band covered by the spectrum fragment associated with this set and a spectral transposition term in the frequency band covered by the spectrum fragment associated with this set.

BRIEF DESCRIPTION OF THE DRAWINGS

Other aspects, purposes, advantages and characteristics of the invention will be better understood after reading the detailed description given below of preferred embodiments of the invention, given as non-limitative examples, with reference to the appended drawings on which.

DETAILED DESCRIPTION

Figure 1:
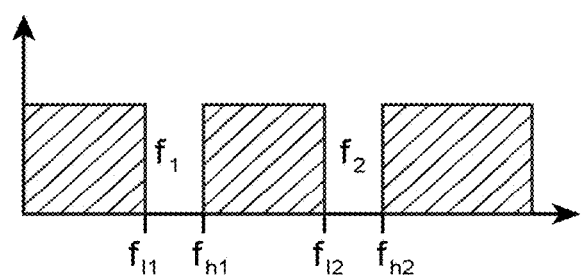
FIG. 1 is a diagram of a fragmented spectrum.

The invention relates to a device for transmission of data on a fragmented spectrum, namely a frequency spectrum divided into a plurality $N_f$ of spectrum fragments each of which covers a frequency band, the frequency bands being discontiguous. FIG. 1 represents the case of a fragmented spectrum with two spectrum fragments $f_1$, $f_2$ covering the frequency bands delimited in frequency by $f_{l1}$, $f_{h1}$ and $f_{l2}$, $f_{h2}$ respectively, where $f_{l2} > f_{h1}$.

Figure 2:
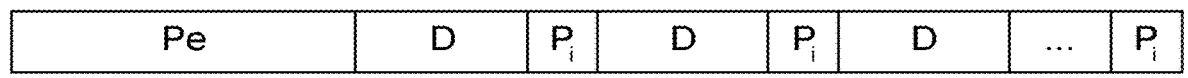
FIG. 2 represents a data frame carrying signalling sequences.

The device according to the invention comprises a packet generator configured to generate a data packet comprising a payload and at least one occurrence of a signalling sequence. As illustrated on FIG. 2, a packet thus generated is composed of a preamble Pe and pilots Pi uniformly distributed in the data D (i.e. the payload). The preamble Pe is used for synchronisation (both temporal and frequential) and the pilots are used for channel estimation. The preamble Pe and/or each of the pilots Pi comprise(s) at least one occurrence of the signalling sequence. In one embodiment, the preamble Pe comprises several occurrences of the signalling sequence, for example successive occurrences of the signalling sequence.

The packet generator of the device according to the invention is configured more particularly to generate a packet for which the at least one signalling sequence S is a constant envelope sequence. This constant envelope sequence S comprises N complex symbols, each denoted S[n] when n is an integer between 0 and N−1. The N complex symbols are distributed into a plurality $N_f$ of sets of complex symbols, each of these sets being associated with one of the spectrum fragments and comprising $N/N_f$ complex symbols.

For each set of complex symbols, the constant envelope sequence S comprises more particularly a scaling term to the frequency band covered by the spectrum fragment associated with this set and a spectral transposition term in the frequency band covered by the spectrum fragment associated with this set.

Consider a fragmented spectrum composed of $N_f$ spectrum fragments, in which each fragment n°i, in which $0 \leq i \leq N_f - 1$, covers a frequency band delimited by a low frequency $f_{li}$ and by a high frequency $f_{hi}$ and has a width $\Delta f_i = f_{li} - f_{hi}$. The packet generator associates a set of $N/N_f$ symbols with the spectrum fragment n°i of the fragmented spectrum, in which each symbol comprises a scaling term to the frequency band $\Delta f_i$ covered by the corresponding spectrum fragment and a spectral transposition term in the frequency band $[f_{li}; f_{hi}]$ covered by the corresponding spectrum fragment.

In one possible embodiment, for $$\frac{iN}{N_f} \leq n < \frac{(i+1)N}{N_f},$$

a set of complex symbols is defined associated with fragment n°i and for which $S[n] = Sca(\Delta f_i) * TF(f_{li})$ in which $Sca(\Delta f_i)$ is a scaling term to the frequency band $\Delta f_i$ that makes it possible to distribute symbols uniformly on this band and $TF(f_{li})$ is a spectral transposition term in the frequency band $[f_{li}; f_{hi}]$ which makes it possible for symbols to be distributed in this band.

Starting from a CAZAC sequence, for example a Zadoff-Chu sequence or a Bjorck sequence, the $Sca(\Delta f_i)$ term makes it possible, by a phase interpolation, to obtain a modified CAZAC sequence that occupies the right bandwidth and that has a constant amplitude. The term $TF(f_{li})$ translates this modified CAZAC sequence into the right band.

To guarantee a constant envelope, we could for example choose $$Sca(\Delta fi) = \exp\left(\frac{j2\pi\left(n - \frac{iN}{N_f}\right)^2 \Delta f_i}{Nf_{ech}}\right)$$

and $TF(f_{li}) = \exp(j2\pi v_{li} n)$, in which $f_{ech}$ is the sampling frequency of the data to be transmitted and $v_{li}$ is the reduced frequency $f_{li}/f_{ech}$. In this example, the signalling sequence S is a modified Zadoff-Chu sequence that is expressed as follows:

$$S[n] = \begin{cases} \exp\left(\frac{j2\pi n^2 \Delta f_0}{Nf_{ech}}\right) \times \exp(j2\pi v_{l0} n) & \text{for } n < \frac{N}{N_f} \\ \vdots & \vdots \\ \exp\left(\frac{j2\pi\left(n - \frac{iN}{N_f}\right)^2 \Delta f_i}{Nf_{ech}}\right) \times \exp(j2\pi v_{li} n) & \text{for } \leq n < \frac{(i+1)N}{N_f} \\ \vdots & \vdots \\ \exp\left(\frac{j2\pi\left(n - (N_f - 1) \times \frac{N}{N_f}\right)^2 \Delta f_{N_f-1}}{Nf_{ech}}\right) \times \exp(j2\pi v_{lN_f-1} n) & \text{for } n \geq (N_f - 1) \times \frac{N}{N_f} \end{cases}$$

Taking the example in FIG. 1 with a fragmented spectrum composed of two discontiguous bands, in which $$v_{l1} = \frac{f_{l1}}{f_{ech}}, v_{l2} = \frac{f_{l2}}{f_{ech}}$$

are the reduced frequencies, the signalling sequence is expressed as:

$$S[n] = \begin{cases} \exp\left(\frac{j2\pi n^2 \Delta f_1}{Nf_{ech}}\right) \times \exp(j2\pi v_{l1} n) & \text{for } n < \frac{N}{2} \\ \exp\left(\frac{j2\pi\left(n - \frac{N}{2}\right)^2 \Delta f_2}{Nf_{ech}}\right) \times \exp(j2\pi v_{l2} n) & \text{for } n \geq \frac{N}{2} \end{cases}$$

Such a sequence has a constant envelope ($|S[n]|=1$) and therefore the PAPR is 0 dB. This sequence can thus be used with constant envelope wave shapes while keeping the energy efficiency of the transmitter power amplifier.

Figure 3:
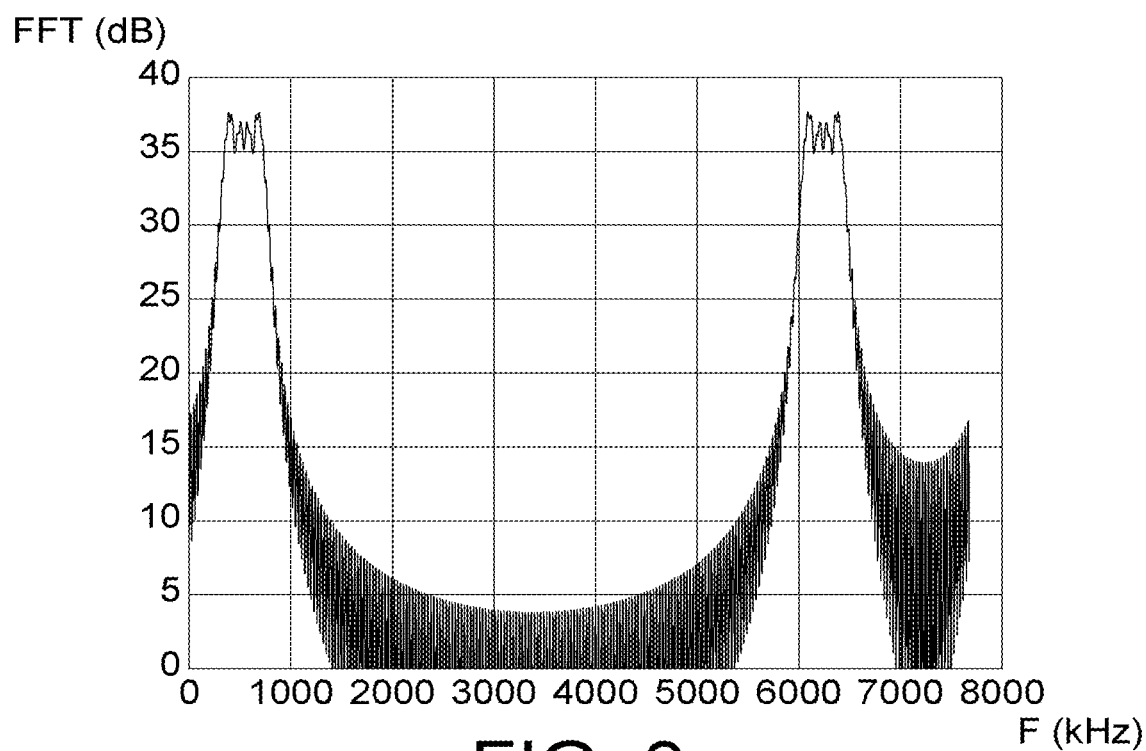
FIG. 3 is a diagram of the frequential spectrum of a signalling sequence according to the invention adapted to a fragmented spectrum comprising two discontiguous bands.

FIG. 3 represents the frequential spectrum (the result of a Fast Fourier Transform, FFT, in dB as a function of the frequency, F, in kHz) of this signalling sequence in which $f_{ech}$=15.36 MHz, $v_{l1}$=300 kHz, $v_{l2}$=6000 kHz, N=1024 and a same band width for the two bands $\Delta f_1 = \Delta f_2 = 480$ kHz. It is found that this sequence comfortably covers the two required bands.

Figure 4:
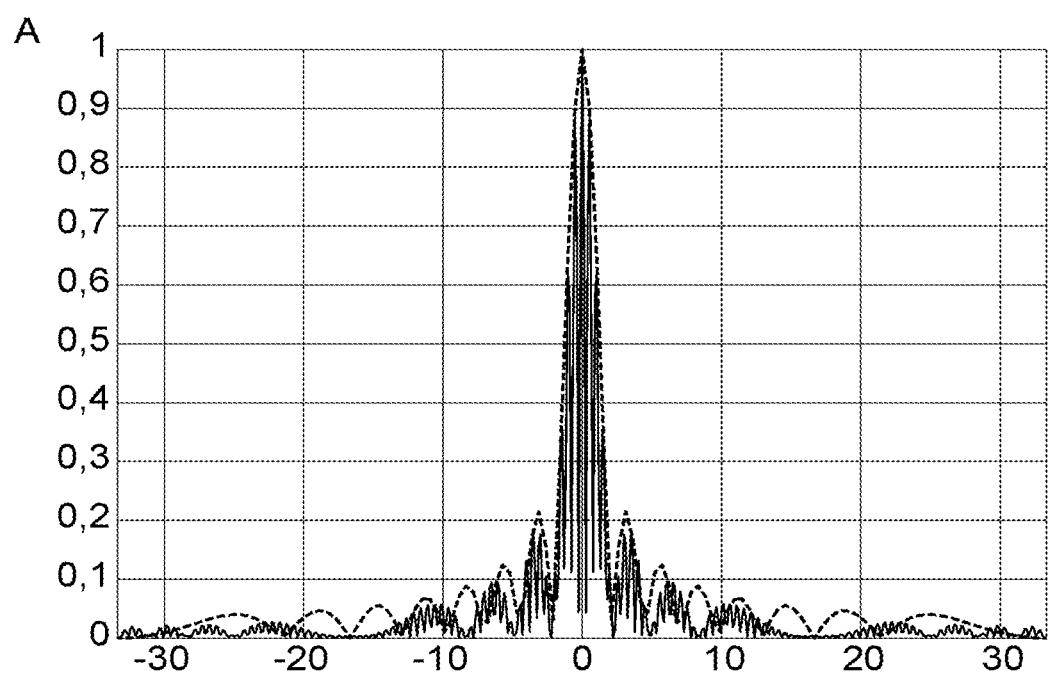
FIG. 4 represents the auto-correlation function of a signalling sequence according to the invention adapted to a fragmented spectrum comprising two discontiguous bands and the auto-correlation function of a signalling sequence disclosed in the above mentioned paper by F. Dehmas et al, for comparison purposes.

FIG. 4 also shows the auto-correlation function A of this signalling sequence according to the invention (in continuous lines) and that of the signalling sequence adapted to a single band as disclosed in the above-mentioned paper by F. Dehmas et al. (in dashed lines). It can be seen that the auto-correlation properties are not degraded in comparison with the single band according to prior art; the width of the principal peak is kept and the secondary peaks have the same level for an identical total band width.

Figure 5:
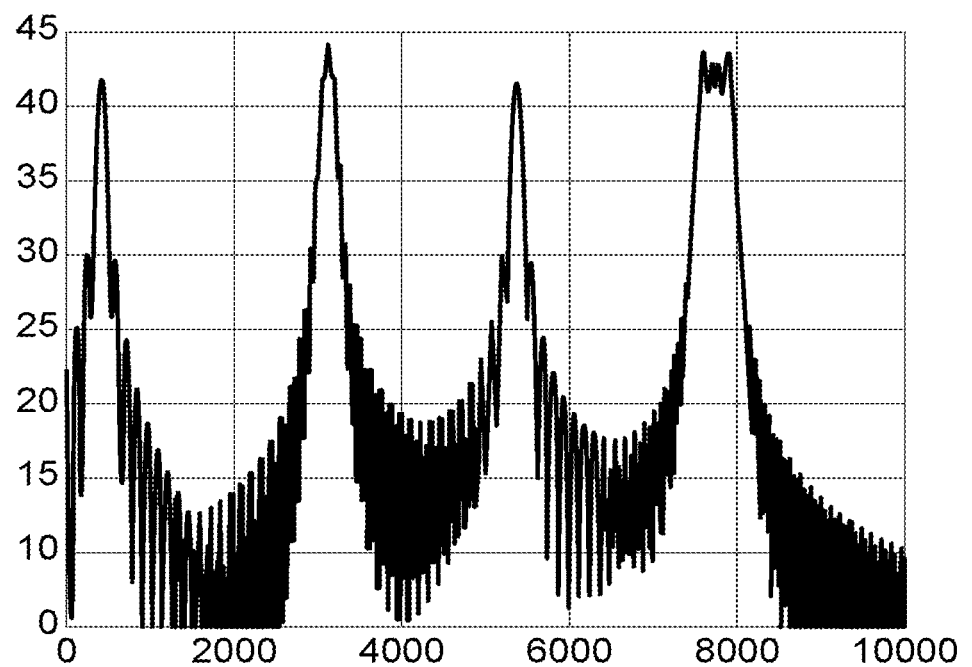
FIG. 5 is a diagram of the frequential spectrum of a signalling sequence according to the invention adapted to a fragmented spectrum comprising four discontiguous bands.
Figure 6:
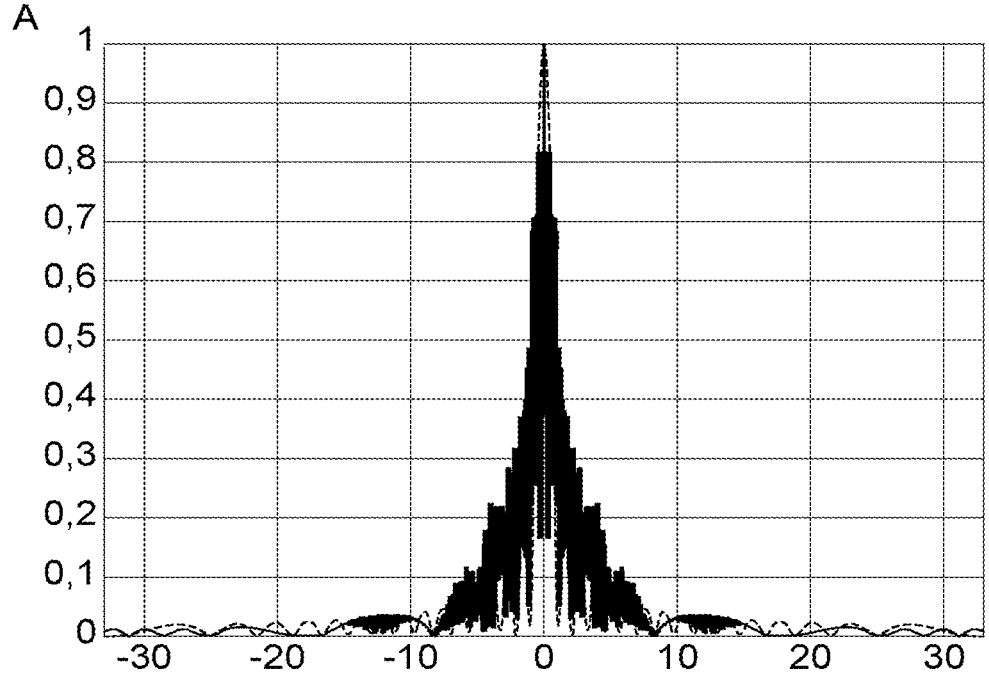
FIG. 6 represents the auto-correlation function of a signalling sequence according to the invention adapted to a fragmented spectrum comprising four discontiguous bands and the auto-correlation function of a signalling sequence disclosed in the above mentioned paper by F. Dehmas et al, for comparison purposes.

FIGS. 5 and 6 illustrate that these properties are kept in the case of a signalling sequence according to the invention adapted to a fragmented spectrum composed of four spectrum fragments. Thus, FIG. 5 represents the frequency spectrum (resulting from a Fast Fourier Transform, FFT, in dB as a function of the frequency, F, in kHz) of such a signalling sequence in which $\Delta f_1 = \Delta f_3 = 120$ kHz, $\Delta f_2 = 240$ kHz, $\Delta f_4 = 480$ kHz, $f_{ech}$=15.36 MHz, $v_{l1}$=300 kHz, $v_{l2}$=3000 kHz, $v_{l3}$=5250 kHz, $v_{l4}$=7500 kHz and N=1024. This sequence comfortably covers the required bands. FIG. 6 also represents the auto-correlation function A of this signalling sequence (in continuous lines) and that of the signalling sequence adapted to a single band as disclosed in the above-mentioned paper by F. Dehmas et al. (in dashed lines), for comparison purposes. It is found that the auto-correlation properties are similar to the case of the non-fragmented spectrum for the same total band width.

Figure 7:
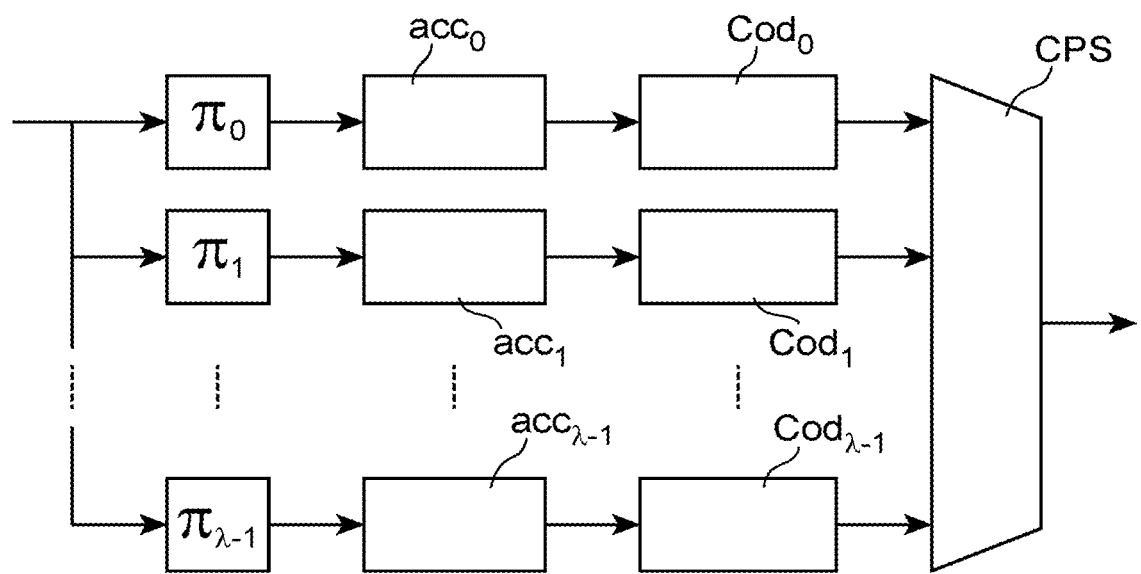
FIG. 7 is a diagram of a unit of a data transmission device according to the invention configured to use a Turbo-FSK modulation.

In one preferred embodiment, and as represented on FIG. 7, the transmission device according to the invention comprises a modulator capable of implementing the Turbo-FSK modulation. This modulator is composed of $\lambda$ stages, each encoding a differently interlaced version of Q information bits. At each stage, the Q information bits are interlaced by an interlacer $\pi_0, \pi_1, \ldots, \pi_{\lambda-1}$ then grouped into blocks of q bits, each block being sequentially encoded using a parity accumulator $acc_0, acc_1, \ldots, acc_{\lambda-1}$. The q+1 resulting bits are associated with a code word in the FSK coplanar alphabet using an encoder $cod_0, cod_1, \ldots, cod_{\lambda-1}$, in other words associated with a phase modulation with order $N_L$ ($N_L$-PSK) and a frequency modulation with order $N_\perp$ ($N_\perp$-FSK), in which $q+1=\log_2(N_L N_\perp)$. Due to the accumulator, each FSK coplanar symbol is connected to its predecessor. A parallel to serial converter CPS terminates the chain to transmit the symbols in the channel.

Figure 8:
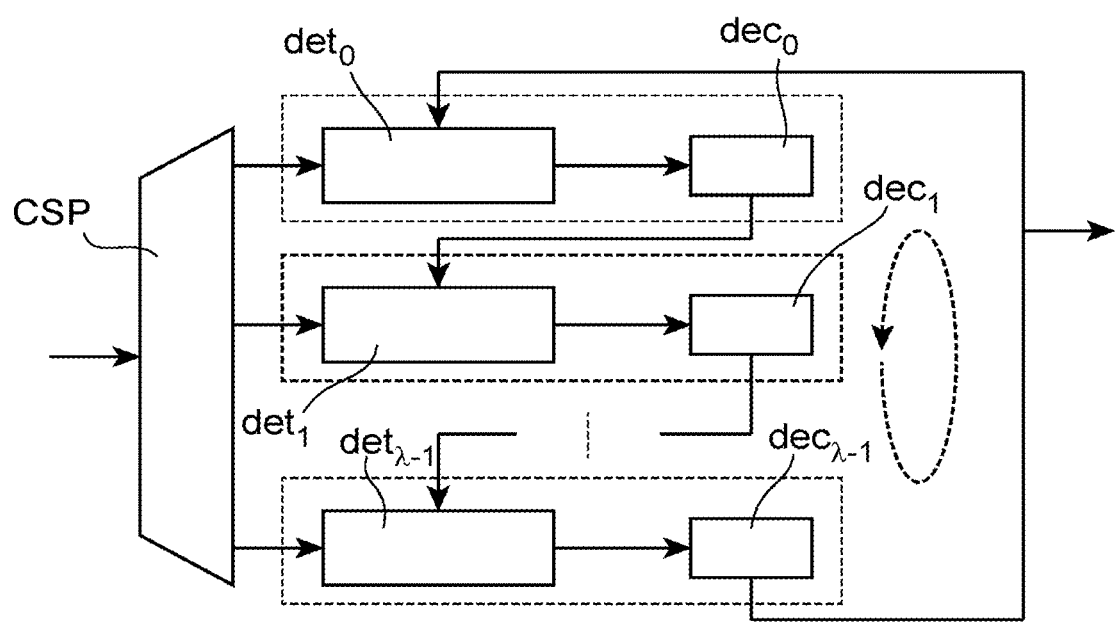
FIG. 8 is a diagram of a unit of a data reception device configured to use a Turbo-FSK demodulation.

FIG. 8 represents a data reception device configured to use a Turbo-FSK demodulation. This device comprises a serial to parallel converter CPS to reconstruct the $\lambda$ transmitted stages. A detector $det_0, det_1, \ldots, det_{\lambda-1}$ makes the estimation of the probabilities of each possible code word. These probabilities are supplied to a decoder $dec_0, dec_1, \ldots, dec_{\lambda-1}$ that uses them as observations, outputs from other decoders being used as a priori information. A modified BCJR algorithm, as described by L. Bahl, J. Cocke, F. Jelinek, and J. Raviv, "Optimal decoding of linear codes for minimizing symbol error rate (corresp.)," IEEE Trans. on Information Theory, vol. 20, No. 2, pp. 284-287, March 1974, is used to obtain a posteriori probabilities of the information bits.

This reception device also comprises a synchronisation unit and a channel estimation unit. At least one of these units is configured to exploit the previously described signalling sequence, that is known to the reception device. The synchronisation unit can thus be configured to correlate a received signal with the known signalling sequence. And the channel estimation unit can thus be configured to make a deconvolution of the signal received by the known signalling sequence.

The following considers the example of a fragmented spectrum comprising two fragments, one covering the 300 kHz to 765 kHz band and the other covering the 6000 kHz to 6465 kHz band (these two bands are given in base band, the RF band being a translation of these bands towards the RF band used). A Turbo-FSK modulation is used, characterised by $N_\perp=64$, with 32 possible frequencies in the first band and 32 possible frequencies in the second band, $N_L=16$ and $\lambda=4$. Simulations were made on an "Extended Pedestrian A" (EPA) propagation channel used by the 3GPP. It corresponds to a residential environment with ranges of the order of a kilometre. The packets are compose of 1008 useful bits.

Figure 9:
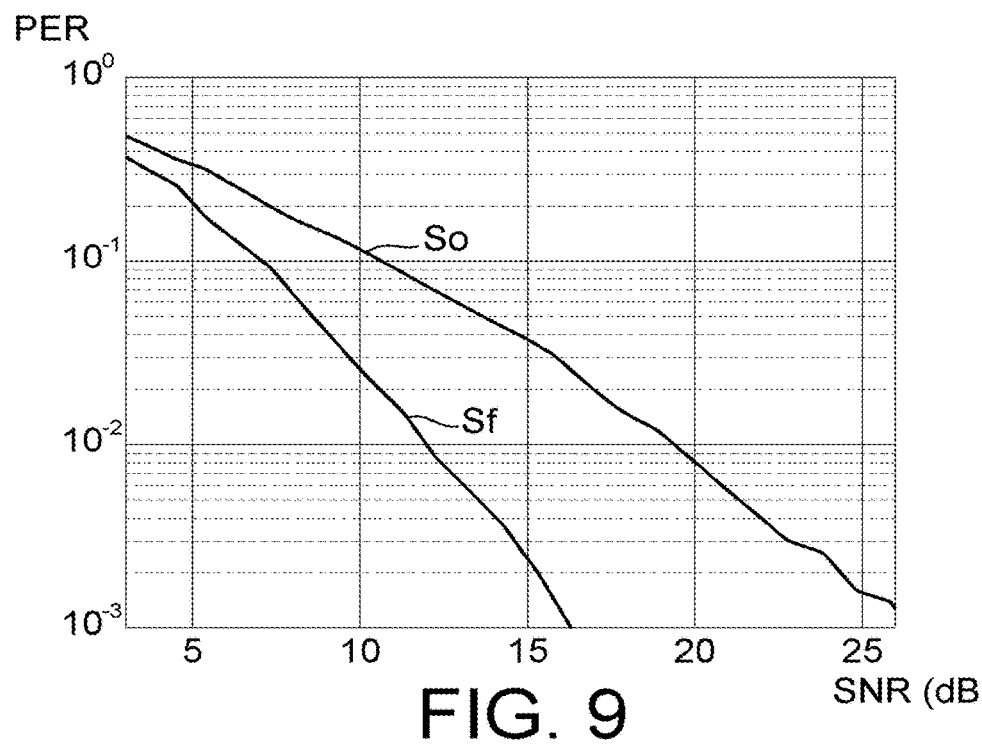
FIG. 9 compares the packet error rate as a function of the signal to noise ratio of the Turbo-FSK modulation depending on whether the spectrum is or is not fragmented.

FIG. 9 compares the packet error rate PER as a function of the signal to noise ratio SNR of the Turbo-FSK modulation depending on whether the spectrum is fragmented (curve Sf) is or is not fragmented (curve 50). This FIG. 9 illustrates the gain in frequential diversity obtained by using a fragmented spectrum. In particular, there is a gain of 7 dB for a packet error rate of 1%.

Figure 10:
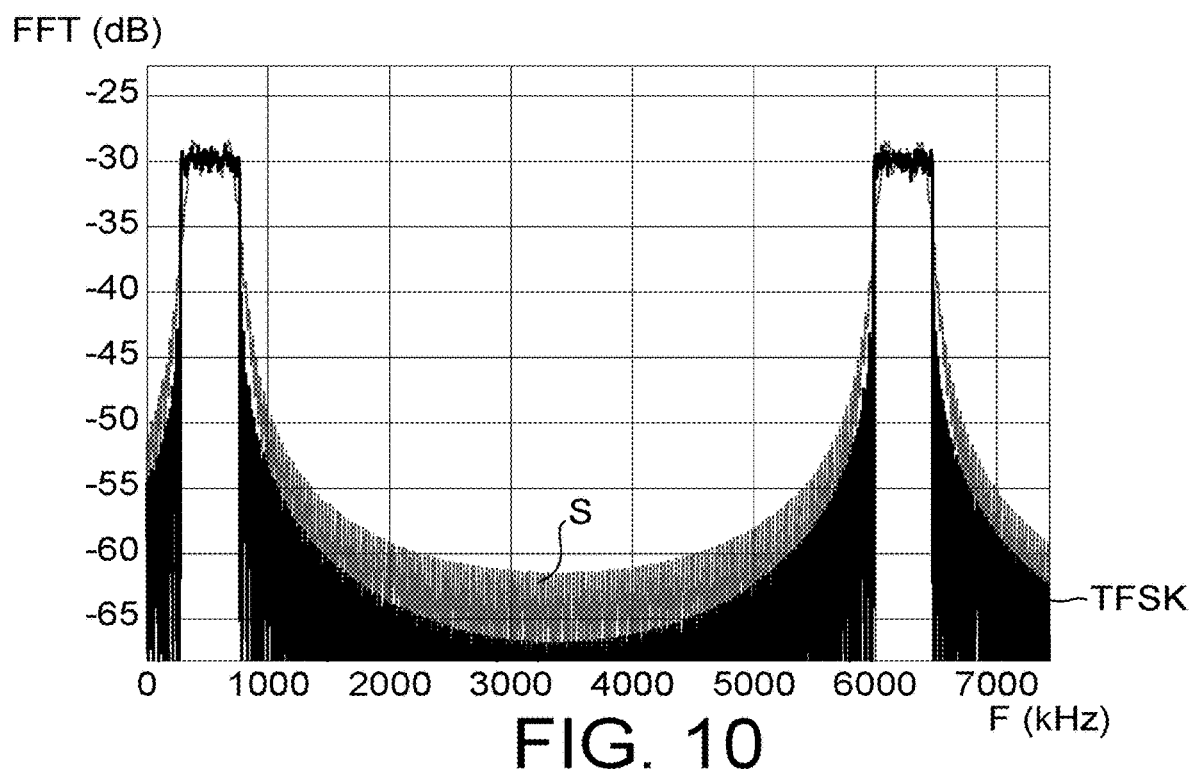
FIG. 10 compares the spectral shape of the Turbo-FSK modulation with that of a signalling sequence according to the invention adapted to a fragmented spectrum comprising two discontiguous bands.

FIG. 10 compares the spectral shape (FFT, in dB) of the Turbo-FSK modulation (curve TFSK) with that of a signalling sequence according to the invention adapted to the fragmented spectrum composed of two discontiguous bands (curve S). It can be seen that these spectral shapes are similar both inside the bands used (where the amplitudes are very close) and outside the bands. Outside the band, the maximum difference is 6 dB for a hole of about 38 dB. The levels of sequence rejection, admittedly not quite as good as the modulation, are nevertheless comparable.

The invention thus discloses the construction of a preamble using the signalling sequence described above, this sequence possibly being repeated so as to improve synchronisation performances while keeping good auto-correlation and PAPR properties. Similarly, this sequence can be used as a pilot by repeating it at different locations inf the packet. The invention can then be used to obtain a physical layer with a constant envelope (PAPR=0 dB), on data as on the signalling part (preamble and pilots). Since the auto-correlation properties are similar to the case of the non-fragmented spectrum (see FIGS. 4 and 6), the synchronisation performances are similar in the fragmented spectrum and non-fragmented spectrum cases. The same applies for the channel estimation due to a practically flat spectral amplitude in the useful bands.

The invention is not limited to the data transmission device, but it also relates to a data reception device from a fragmented spectrum, said device comprising a synchronisation unit and a channel estimation unit, at least one of said units being configured to use the previously described signalling sequence. The invention also relates to a data transmission method comprising the generation of packets carrying this signalling sequence and a method of reception of data comprising a synchronisation step and a channel estimation step, at least one of said steps using this signalling sequence.

The invention claimed is:
1. A device for transmission of data on a frequency spectrum divided into a plurality $N_f$ of spectrum fragments each covering a frequency band, the frequency bands being discontiguous, comprising a packet generator configured to generate a data packet comprising a payload and at least one occurrence of a constant envelope signalling sequence, said sequence comprises N complex symbols and consists of a plurality of complex symbol sets each associated with one of the spectrum fragments, each set comprising N/Nf complex symbols and each complex symbol of a set comprises a spectral transposition term that distribute the complex symbol in the frequency band covered by the spectrum fragment associated with this set and a scaling term that distribute uniformly the complex symbols of the set in the frequency band covered by the spectrum fragment associated with this set, wherein each symbol S[n] of the set associated with the i-th spectrum fragment corresponds to $Sca(\Delta f_i)*TF(f_{li})$ wherein $Sca(\Delta f_i)$ is the scaling term and $TF(f_{li})$ is the spectral transposition term, wherein $$\frac{iN}{N_f} \leq n < \frac{(i+1)N}{N_f}$$

and wherein the i-th spectrum fragment covers a frequency band that is delimited by a low frequency $f_{li}$, a high frequency $f_{hi}$ and has a width of $\Delta f_i = f_{li} - f_{hi}$.

2. The device according to claim 1, further comprising a modulator configured to implement a Turbo-FSK (frequency shift keying) modulation.

3. The device according to claim 1, wherein $$Sca(\Delta fi) = \exp\left(\frac{j2\pi\left(n - \frac{iN}{Nf}\right)^2 \Delta f_i}{Nf_{ech}}\right)$$

and $TF(f_{li})=\exp(j2\pi v_{li}n)$, in which $f_{ech}$ is a sampling frequency of the transmitted data and $v_{li}$ is a reduced frequency defined by $f_{li}/f_{ech}$.

4. The device according claim 1, wherein the data packet generated by the packet generator comprises a preamble and the packet generator is configured to insert the at least one occurrence of said sequence as a synchronisation sequence in the preamble.

5. The device according to claim 4, wherein the preamble carries a plurality of occurrences of said sequence, in succession.

6. The device according to claim 1, wherein the packet generator is configured to insert the at least one occurrence of said sequence in the payload as a pilot sequence.

7. A method for reception of data from a frequency spectrum divided into a plurality $N_f$ of spectrum fragments each covering a frequency band, the frequency bands being discontiguous, comprising a synchronisation step and a channel estimation step, and wherein at least one of said steps uses a known constant envelope signalling sequence, said sequence comprises N complex symbols and consists of a plurality of complex symbol sets each associated with one of the spectrum fragments, each set comprising N/Nf complex symbols and each complex symbol of a set comprises a spectral transposition term that distribute the complex symbol in the frequency band covered by the spectrum fragment associated with this set and a scaling term that distribute uniformly the complex symbols of the set in the frequency band covered by the spectrum fragment associated with this set, wherein each symbol S[n] of the set associated with the i-th spectrum fragment corresponds to $Sca(\Delta f_i)*TF(f_{li})$ wherein Sca($\Delta f_i$) is the scaling term and TF($f_{li}$) is the spectral transposition term, wherein $$\frac{iN}{N_f} \leq n < \frac{(i+1)N}{N_f}$$

and wherein the i-th spectrum fragment covers a frequency band that is delimited by a low frequency $f_{li}$, a high frequency $f_{hi}$i and has a width of $\Delta f_i = f_{li} - f_{hi}$.

8. A device for reception of data from a frequency spectrum divided into a plurality $N_f$ of spectrum fragments each covering a frequency band, the frequency bands being discontiguous, said device comprising a synchronisation unit and a channel estimation unit and wherein at least one of said units is configured to exploit a constant envelope signalling sequence known to said device, said sequence comprises N complex symbols and consists of a plurality of complex symbol sets each associated with one of the spectrum fragments, each set comprising N/Nf complex symbols and each complex symbol of a set comprises a spectral transposition term that distribute the complex symbol in the frequency band covered by the spectrum fragment associated with this set and a scaling term that distribute uniformly the complex symbols of the set in the frequency band covered by the spectrum fragment associated with this set, wherein each symbol S[n] of the set associated with the i-th spectrum fragment corresponds to Sca($\Delta f_i$)*TF($f_{li}$) wherein Sca($\Delta f_i$) is the scaling term and TF($f_{li}$) is the spectral transposition term, wherein $$\frac{iN}{N_f} \leq n < \frac{(i+1)N}{N_f}$$

and wherein the i-th spectrum fragment covers a frequency band that is delimited by a low frequency $f_{li}$, a high frequency $f_{hi}$i and has a width of $\Delta f_i = f_{li} - f_{hi}$.

9. A method for transmission of data on a frequency spectrum divided into a plurality $N_f$ of spectrum fragments each covering a frequency band, the frequency bands being discontiguous, wherein said method comprises generation of a data packet comprising a payload and at least one occurrence of a constant envelope signalling sequence, said sequence comprises N complex symbols and consists of a plurality of complex symbol sets each associated with one of the spectrum fragments, each set comprising N/Nf complex symbols and each complex of a set comprises a spectral transposition term that distribute the complex symbol in the frequency band covered by the spectrum fragment associated with this set and a scaling term that distribute uniformly the complex symbols of the set in the frequency band covered by the spectrum fragment associated with this set, wherein each symbol S[n] of the set associated with the i-th spectrum fragment corresponds to Sca($\Delta f_i$)*TF($f_{li}$) wherein Sca($\Delta f_i$) is the scaling term and TF($f_{li}$) is the spectral transposition term, wherein $$\frac{iN}{N_f} \leq n < \frac{(i+1)N}{N_f}$$

and wherein the i-th spectrum fragment covers a frequency band that is delimited by a low frequency $f_{li}$, a high frequency $f_{hi}$i and has a width of $\Delta f_i = f_{li} - f_{hi}$.

* * * * *